VERTICAL COVERAGE
OF BEAM

INVENTOR.
WILLIAM E. STONEY

FIG. 6

INVENTOR.
WILLIAM E. STONEY

United States Patent Office 3,165,740
Patented Jan. 12, 1965

3,165,740
TERRAIN CLEARANCE RADAR
William E. Stoney, Whittier, Calif., assignor to
North American Aviation, Inc.
Filed July 30, 1959, Ser. No. 830,675
13 Claims. (Cl. 343—16)

This invention relates to terrain clearance radar, and more particularly concerns radar capable of yielding information as to the relative height and position of targets illuminated thereby. The invention is of particular utility in the avoidance of obstacles lying in the path of low flying aircraft.

The present invention is an improvement on the profiloscope radar system described in the co-pending application, Serial No. 698,893, for Profiloscope, filed by W. L. Mitchell, on November 20, 1957. The present invention has as one of its objects the removal of errors inherent in the system described in the Mitchell application and is designed to be applicable more readily to future radar sets and to increase the vertical range within which terrain clearance information is available. The present system has been found to be simpler and more reliable in actual flight test. Greater ranges are made available without increase of transmitted radar power.

Accordingly, an object of this invention is to provide an improved terrain viewing radar system.

In carrying out the invention in accordance with a preferred form thereof, there is provided a monopulse radar having an antenna and receiver producing sum and difference signals. Computing circuitry responsive to the sum and difference signals generates an output signal indicative of the elevation of a target illuminated by the radar beam relative to a selected clearance plane. The clearance plane is selectively adjustable and in order to increase the coverage of the system, the elevation angle of the antenna is adjusted in accordance with adjustment of the clearance plane. The radar of the invention provides an output signal for all targets which protrude above the selected clearance plane. The clearance plane may be adjusted to be above or below the vehicle carrying the radar. The system is arranged to compute vertical distance between the illuminated target and a reference plane which contains either the flight path of the vehicle (terrain avoidance mode) or a horizontal through the vehicle (contour mapping mode).

In order to increase the range and precision of the computation, the basic equation which defines the geometry of the problem solved by the system is rewritten into a form which is more readily mechanized with electronic circuits.

A further object of the invention is therefore to increase the angular coverage of a ground viewing radar.

Another object of the invention is the concomitant adjustment of clearance plane and antenna elevation angle of a terrain clearance radar system so as to cause the radar beam centerline to intersect the clearance plane at a fixed range despite adjustment of the clearance plane.

Still another object of the invention is the provision of improved computing circuitry in a terrain clearance radar.

These and other objects of the invention will become apparent from the following description taken in connection with the accompanying drawings in which

FIG. 1 depicts the geometry of the problem solved by this invention;

In the drawings, like reference characters refer to like parts.

Figure 1:
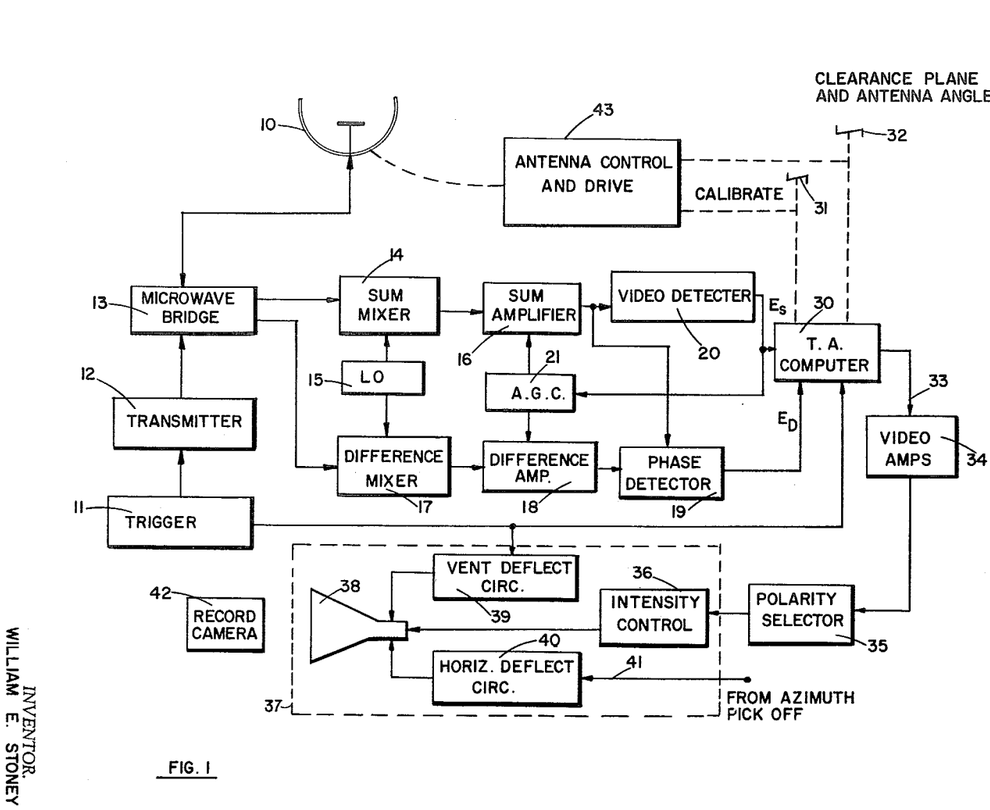
FIG. 1 is a block diagram of a preferred form of the invention.

Illustrated in FIG. 1 is a block diagram of an embodiment of the radar system of this invention which is particularly designed to be carried by a low flying aircraft so as to provide the pilot thereof with information as to the relative contours of the terrain at a distance from the aircraft or with information indicating range and bearing of all obstacles and terrain above a selected clearance plane which is positioned by the pilot. The radar system includes an antenna 10 which may be of the conventional paraboloid type such as that employed, for example, in the monopulse system described in the co-pending application of R. M. Ashby, Serial No. 216,145, filed March 17, 1951, now Patent No. 2,956,275. Synchronized from a system trigger 11, a transmitter 12 generates pulses of energy in the X-band such as between 8600 and 9600 megacycles per second although other frequencies obviously may be used. The transmitter pulses are fed to the antenna through microwave bridging 13 which also receives the pulse echoes from the antenna for transmission to the sum and difference channels of the monopulse receiver which may be of the type described in the aforementioned application of R. M. Ashby. Other monopulse radars which, with suitable gain control, may be utilized in the practice of the disclosed invention are described in U.S. Patent No. 2,682,656 to Phillips, and U.S. Patent No. 2,817,835 to Worthington, Jr.

The receiver sum channel comprises a sum mixer 14, having a first input from local oscillator 15 and a second input from the antenna 10 via the microwave bridge 13 in the form of additively combined energy from the two lobes of the radiation pattern of antenna 10. While, for the purposes of this invention, the antenna beam need provide but two lobes symmetrical about the antenna centerline and mutually angulated in elevation, it will be readily appreciated that the system may utilize an antenna which additionally provides a pair of azimuth or horizontal lobes for use in conjunction with a second difference (azimuth) receiver channel (not shown), as will be understood by those skilled in the art. The output of sum channel mixer 14 is fed to the intermediate frequency section of the sum channel comprising one or more sum channel amplifiers 16.

The elevation difference channel of the receiver comprises a difference channel mixer 17 having a first input from the local oscillator 15 and a second input from the antenna via the microwave bridge in the form of differentially combined pulse echoes received by the two antenna lobes. The output of the difference mixer is fed to the intermediate frequency difference channel amplifiers 18 and thence to a conventional phase detector 19 which is phase referenced from the sum channel at the output of the intermediate frequency amplifiers 16 thereof. The output of phase detector 19 comprises the elevation difference signal $E_D$ which has a polarity relative to the sum signal and a magnitude indicative of the sense and magnitude of the displacement of the reflecting target from the radar beam centerline.

The output of the intermediate frequency sum channel amplifier 16 is detected in video detector 20 to provide the sum signal $E_S$ which is fed back to the automatic gain control circuitry 21 which in turn controls the gain of both the sum and difference channel amplifiers. The purpose of the automatic gain control, as described in the aforementioned application of W. L. Mitchell, is to stabilize the video outputs over a wide range of video return since the latter will vary as a function of range, target reflectivity and other factors. The automatic gain control functions to compress the magnitudes of the sum and elevation video signals while maintaining a substantially fixed ratio of the gain of the sum and elevation channels. It will be readily understood that the function of the automatic gain control may be provided to some extent by the use of conventional sensitivity time control circuitry either in conjunction with or instead of the automatic gain control. Sensitivity time control circuits which may be utilized in this connection are disclosed, for example in Van Voorhis, Vol. 23, Radiation Laboratory series, pages 251–2, 374–377, sections 9.5 and 14.14. If desired, there may be employed instantaneous automatic gain control circuits of the type described in the aforesaid Mitchell application or by L. N. Ridenour in Volume I of the Radiation Laboratory series, page 459, section 12.8 (FIG. 12.5) and Volume 23 of the Radiation Laboratory series, pages 248 to 251, 369 to 371, sections 9.4 and 14.11.

The sum and difference signals $E_S$ and $E_D$ from video detector 20 and phase detector 19 respectively, are applied to the terrain avoidance computer 30 which will be more particularly described hereinafter. The computer 30 has an input from the system trigger 11, a manual input from a calibration control 31 and a second manual input from a control 32 which sets the height of the clearance plane relative to the radar carrying vehicle. The computer 30 mechanizes the equation to be described below which defines the geometry of the problem to be solved and provides an output signal at lead 33 which is of a predetermined polarity for all those obstacles or targets which protrude above the selected plane. The warning signal on lead 33 is fed through video amplifier 34 to polarity selector 35 which passes only those signals of the desired polarity. The output of the polarity selector is fed to the intensity control 36 of a display device 37 illustrated as comprising a cathode ray tube 38 having vertical and horizontal deflection circuits 39 and 40 for controlling the vertical and horizontal position of the cathode ray beam in a conventional manner. The vertical deflection circuit provides a sawtooth range voltage which is triggered by a signal from the system trigger 11. The horizontal deflection circuit controls the horizontal display point on the screen of the cathode ray tube in accordance with the azimuth position of the antenna. Thus, the horizontal deflection circuit 40 is controlled by an azimuth signal on lead 41 which is coupled to the azimuth pickoff of the antenna which will be described hereinafter. With this arrangement, the cathode ray is positioned horizontally and vertically, respectively, in accordance with the azimuth and range of the target which is displayed by means of the ray intensification. The type of display illustrated is exemplary only. It will be readily appreciated that other display such as the well known PPI display may be utilized where deemed necessary or desirable. If a permanent record of the information obtained by the system is desired, there is provided a recording device such as the camera 42. In the alternative, the signals fed to the display device may be recorded on any suitable permanent recording medium such as magnetic tape, for example.

The antenna 10 is suitably mounted for motion relative to the carrying vehicle in elevation and azimuth under the control of the antenna control and driving mechanism 43. The latter receives as one of the input thereto the calibration signal controlled by manual control 31 and an antenna elevation control signal derived from the manual control 32 which is utilized to set the clearance plane. Thus, upon selection of a particular clearance plane, the antenna elevation angle is adjusted accordingly.

Figure 2:
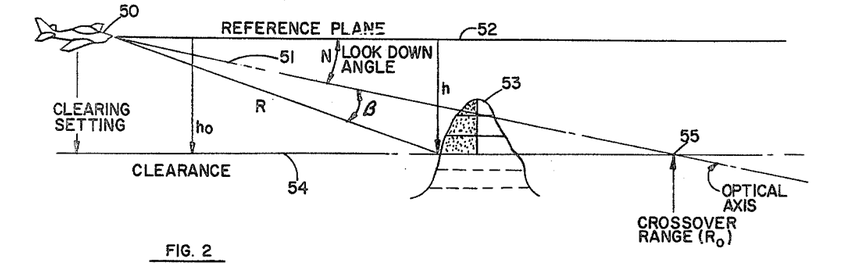
Figure 3A:
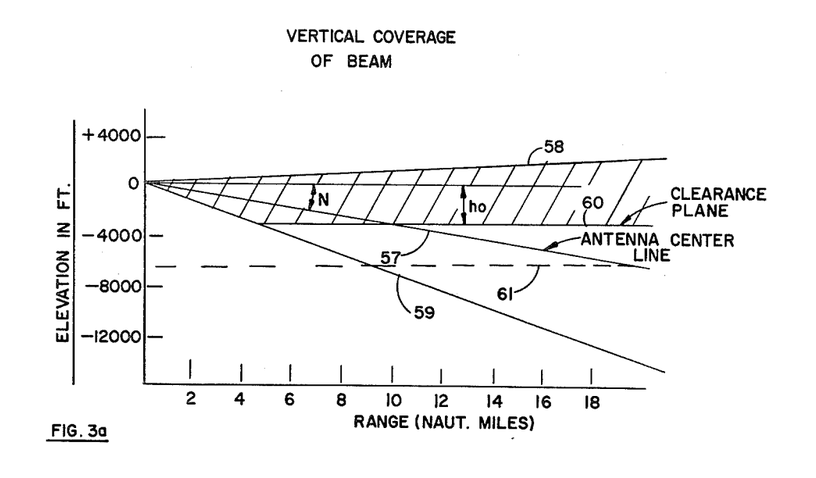
FIGS. 3a and 3b illustrate the vertical coverage of the radar beam.
Figure 3B:
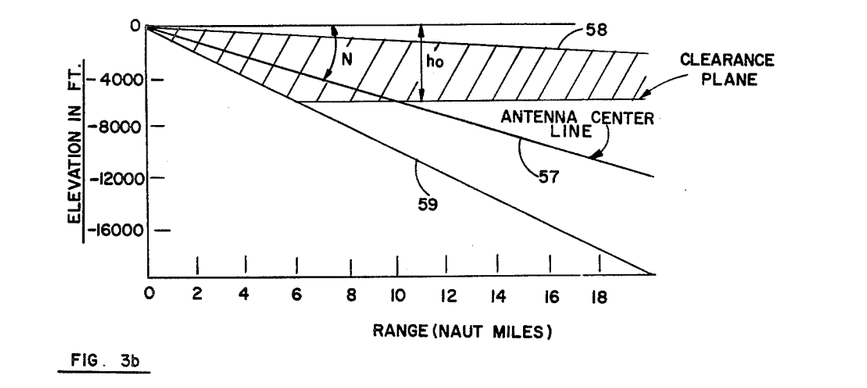

The geometry of the problem is illustrated in FIG. 2 wherein a low flying vehicle such as aircraft 50 carries the system of this invention with the boresight of the antenna directed as depicted by the line 51. Line 52 indicates the reference plane which may be either the flight path (terrain avoidance mode) or a horizontal line (contour mapping mode). Reference numeral 53 indicates an obstacle such as a hill which protrudes above a preset clearance plane 54 which is selected as positioned some distance $h_0$ below the reference plane. The depression angle of the antenna is indicated by the symbol N and comprises the angle between the reference plane and the antenna centerline. The angle B between the antenna centerline and a target at range R, together with the computed vertical distance $h$ between the target and the reference plane, are utilized in the computation. As will be more fully explained hereinafter, the clearance plane 54 and antenna centerline 51 are concomitantly adjusted so as to intersect at the fixed slant range distance $R_0$ which is illustrated as occurring at point 55.

Basically, the clearance of each obstacle such as hill 53 which is scanned by the radar is computed by determining the product of range times the angle between the reference plane and the direction of the return. The preset clearance is then subtracted from the actual clearance. If the result is positive, the aircraft will clear that point by at least the required distance and no warning signals are generated. If the result is negative, the obstacle protrudes above the clearance plane and the pilot is supplied with a signal indicating the range and bearing of the obstacle.

In the use of the system of this invention, aircraft operation is close to the terrain whereby the antenna centerline makes a relatively small angle with the reference plane and clearance plane. Since the sine of a small angle is approximately equal to the angle itself in radians, the perpendicular distance from the reference plane to the ground at any point is given by $$h = R(N+B) \qquad (1)$$

The warning signal $W'$ is defined as $$W' = h - h_0 \qquad (2)$$

This equation defines a condition such that the aircraft will not clear the obstacle by the desired distance when $W'$ is negative but will when $W'$ is positive. Thus, the shaded portion of hill 53 of FIG. 2 would result in a negative value of $W'$ to produce a display on the indicator.

The angle B is derived from monopulse operation but is not measured explicitly in the disclosed system in order to afford more precise and easily mechanized computing circuits. The characteristics of the monopulse beam, as is well known in the art, are such that the ratio of different receiver video output $E_D$ to sum receiver output $E_S$ is proportional to the angle B over the main lobe of the antenna. This may be written as $$B = K_1 \frac{E_D}{E_S} \qquad (3)$$

where $K_1$ is a constant. Since $E_D$ is obtained from a phase sensitive demodulator (phase detector 19 of FIG. 1) which uses $E_S$ as a reference, the angle B has a positive or negative sense. Equations 1 and 3 are substituted in Equation 2 to obtain $$W' = R\left(N + K_1 \frac{E_D}{E_S}\right) - h_0 \qquad (4)$$

By effecting adjustment of the antenna angle in proportion to the clearance plane setting the clearance plane and centerline of the antenna pattern are made to cross at the preselected slant range $R_0$ whereby $$N = \frac{h_0}{R_0} \text{ and } W' = R\left(\frac{h_0}{R_0} + K_1 \frac{E_D}{E_S}\right) - h_0 \qquad (5)$$

Since $E_S$ is always positive, being the reference used in the demodulator, both sides of the equation may be multiplied by $E_S$ without changing the sense of the warning signal. The magnitude of the warning signal, while ated so that a change of control grid bias (which bias is initially set by potentiometer 164) will greatly alter the gain from the suppressor grid to the plate but will vary only slightly the gain from control grid to plate. Thus, with the plates of these tubes 160 and 161 connected in parallel, the application of a positive sawtooth waveform to the control grid of tube 160 via input terminal 151 and a negative sawtooth waveform to the control grid of tube 161 via input terminal 152 will yield a balanced condition representing no output at the plates. The bias control 164 is set to obtain such a condition. When the tubes are operating in this manner, the gain from suppressor to plate of tube 160 increases and the gain from the suppressor to plate of tube 161 decreases in proportion to the amplitude of the two sawtooth waveforms. Therefore, if a positive signal is applied to the suppressor of 160 and a negative signal to the suppressor 161, these two signals can be adjusted to cancel out in the common plate resistor 165 when the sawtooth voltages on the control grids are zero. The adjustment of the suppressor grid bias is achieved by potentiometers 166 and 167. Now as gains from the suppressors to the plates become unbalanced due to the sawtooth waveforms applied at the control grids, the pulses applied to the suppressor grids no longer cancel at the plates. In fact, the net pulse gain at the plates changes in a linear function which is directly related to the amplitude of the sawtooth signals on the control grids. Thus, the plate output at 168 produces a signal proportional to the product of the video signal and the range function.

Figure 7:
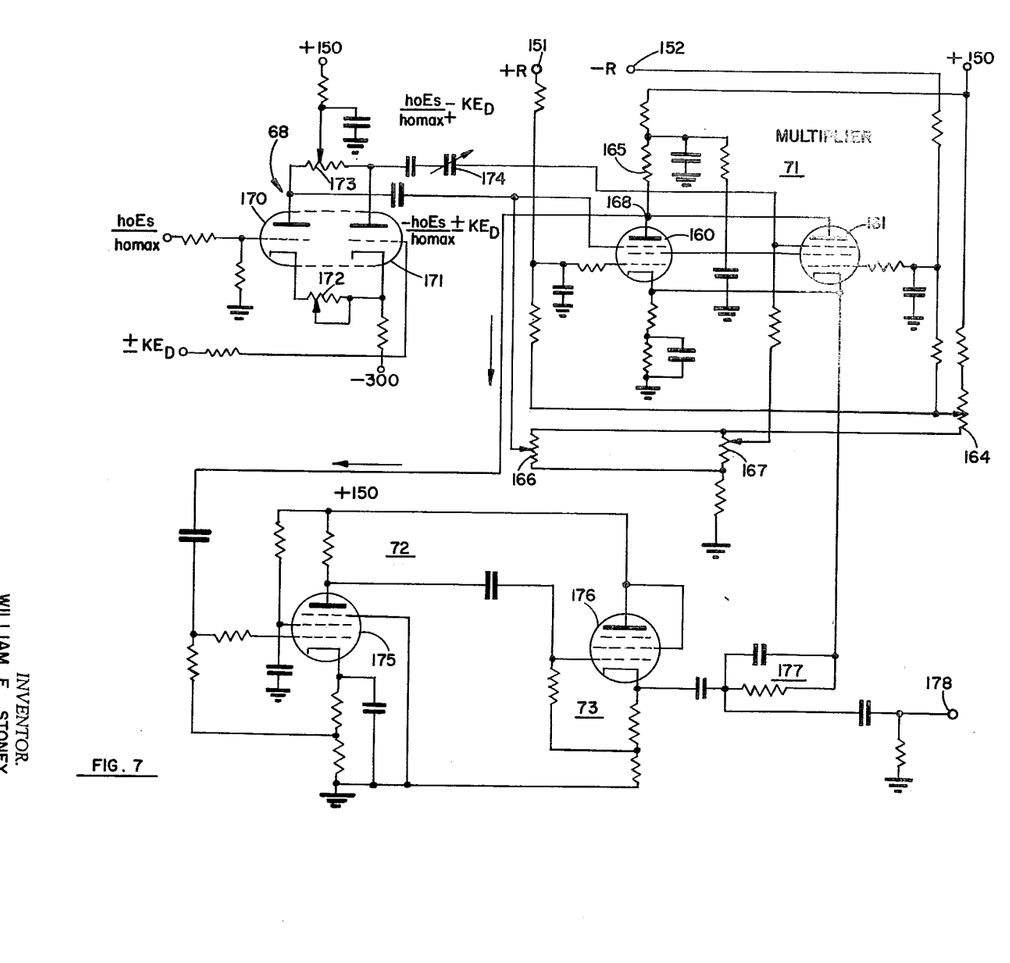

Just as the control grids of the multiplier 71 require opposite sense range function signals, so do the suppressor grids require opposite sense video signals. The video signals required by the multiplier comprise the sum indicated within the parentheses of Equation 9. The signals to be summed, obtained at the cathode of cathode follower 64 and the terminal 143 from selector relay 67, respectively, are applied as indicated in FIG. 7 to the control grids of a dual triode having cathode coupling such that the desired sum and its inverse will be provided at the respective plates of the triode sections 170 and 171. The variable resistance 172 which couples the cathodes of triode sections 170 and 171 is utilized for multiplier calibration. The variable plate resistance 173 is utilized to obtain balance of the two video signals fed to the multiplier. A variable capacitor 174 is inserted in series with either of the two outputs of triode sections 170 and 171 in order to afford bandwidth adjustment.

The output of the multiplier at common plate terminal 168 is fed to pulse amplifier 72 which comprises the pentode 175 having its control grid coupled to the multiplier and its plate coupled to the control grid of a pentode 176 which comprises the cathode follower circuit 73. From the cathode of pentode 176 is derived, via feedback network 177, the stabilizing signal which is applied to the cathodes of the two multiplier tubes. The amplified multiplier output is obtained from the cathode follower 73 at terminal 178 whence it is fed as one input to the mixer and inverter 74 illustrated in detail in FIG. 8.

Figure 4:
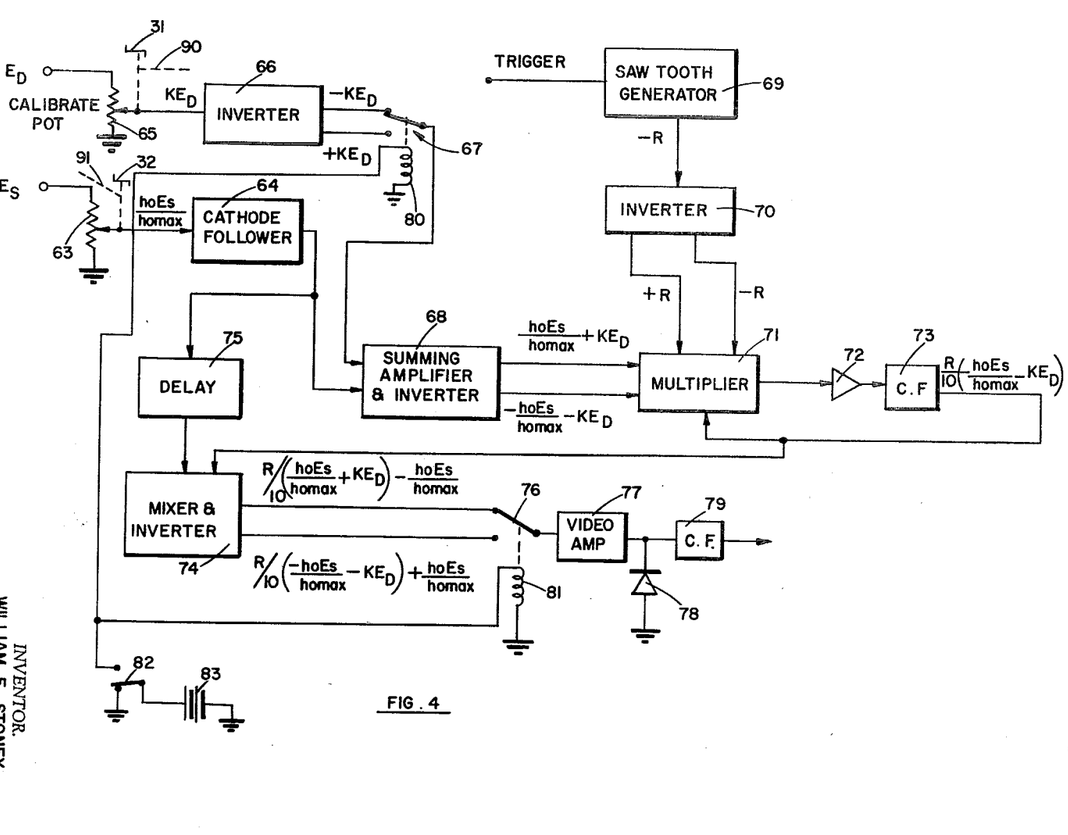
FIG. 4 comprises a block diagram of the computer.
Figure 5:
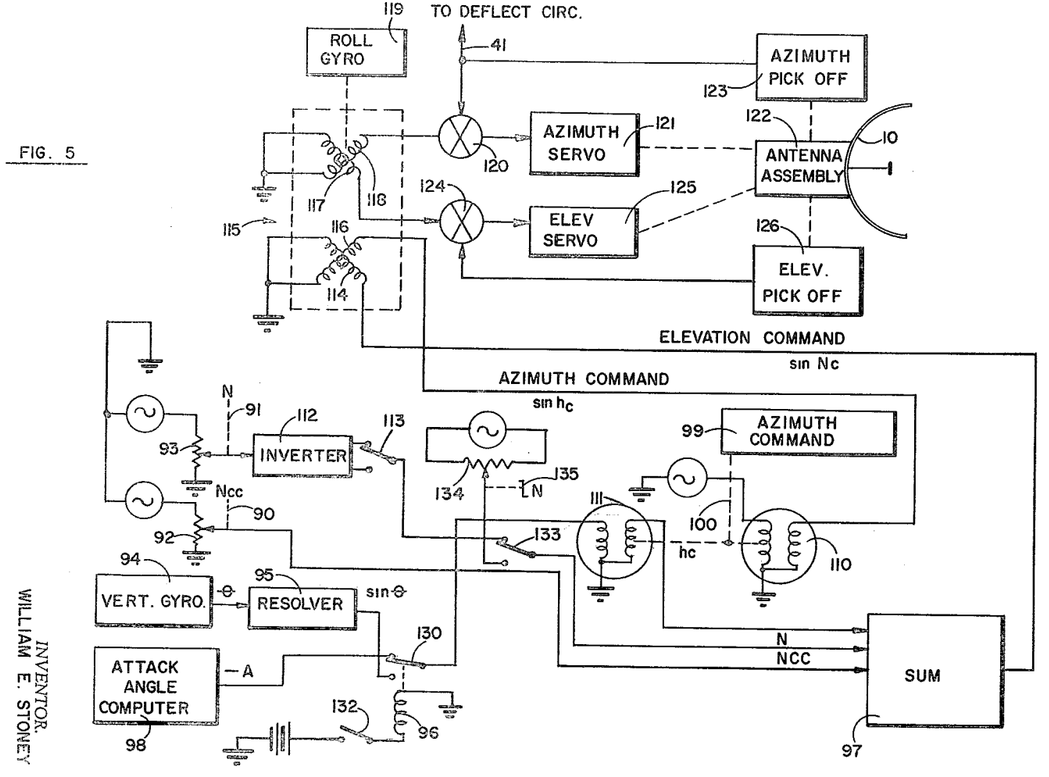
FIG. 5 illustrates details of antenna control and driving arrangement.
Figure 6:
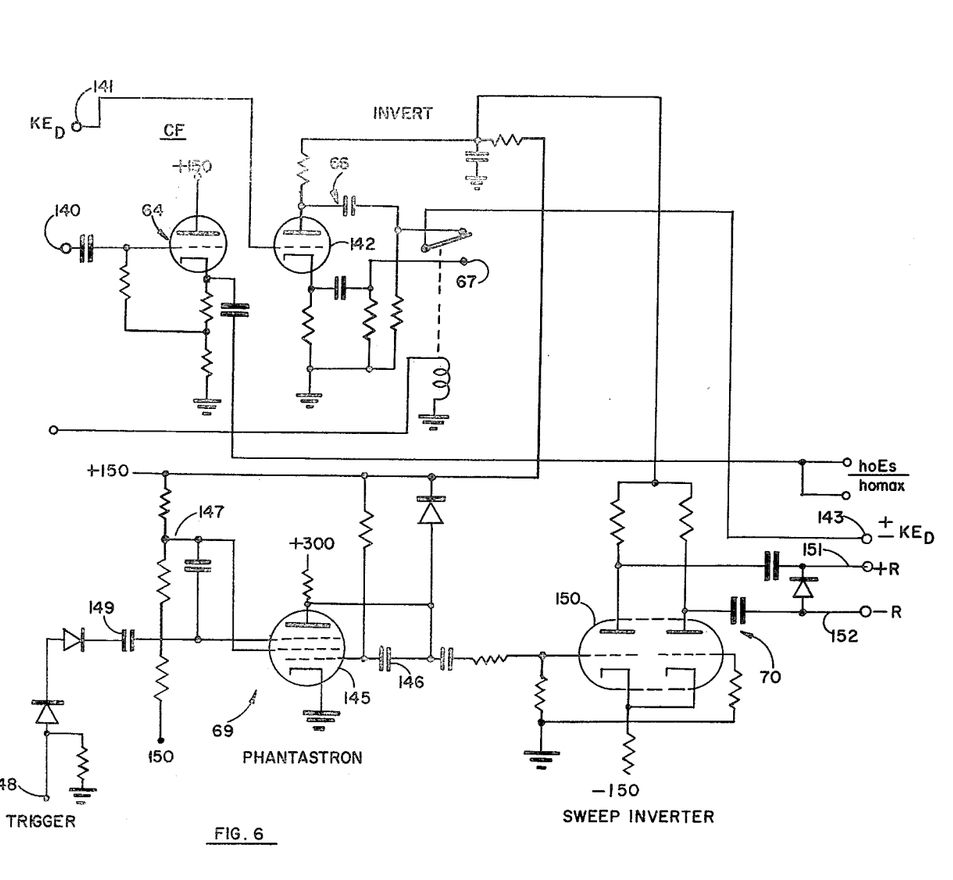
FIGS. 6, 7 and 8 comprise a circuit diagram of the computer of FIG. 4.
Figure 8:
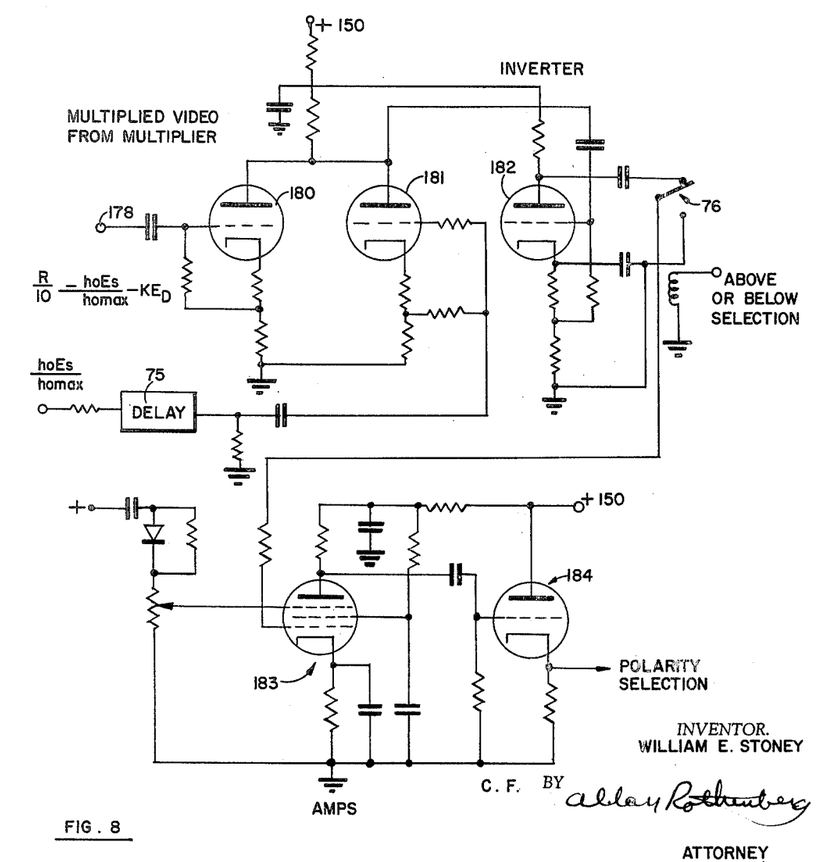

The mixer and inverter includes a first section comprising triodes 180 and 181 having the plates thereof connected in parallel and the control grids thereof connected to respectively receive the multiplier output at terminal 178 and the signal $$\frac{h_o E_S}{h_{o\,max}}$$

which is derived through delay line 75 from the cathode of cathode follower 64. The sum of the two input signals to the triodes 180 and 181 appears at the common plate connection thereof and is fed to the grid of an inverter comprising a triode 182. At the plate and cathode respectively of triode 182 appear the opposite sense signals which comprise the final solution to the warning signal Equation 9. These opposite sense signals are fed to terminals of the polarity selector 76 from whence the warning signal is supplied to the control grid of a pulse amplifier 183. The output of the amplifier 183 is fed to an additional cathode follower stage 184. The warning signal appearing at cathode follower 184 is further amplified and inverted as indicated in FIG. 4 in video amplifier 77, passed through polarity selector 78 to cathode follower 79 and thence to the indicator.

It will be readily appreciated that the system of this invention permits a more precise, reliable and greater range of computation by the particular choice of equation to be mechanized. Additionally, the control of the antenna elevation angle in accordance with the selected clearance plane, greatly increases the angular coverage of the system and also increases the use of the system for clearance settings above the aircraft. Thus, the selection of a clearance plane above the aircraft may automatically position the antenna at optimum elevation angle.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A monopulse radar comprising in combination, means for producing a radiant energy beam with lobes extending on either side of a centerline which extends at a relatively small angle with respect to a selected clearance plane and having a pair of receiver channels for sum and error signals from said lobes, means responsive to variations of said sum signals for compensating both said sum and error signals for variation of signal strength, means responsive to said compensated sum and error signals for indicating distance in a direction normal to said clearance plane between said radar and energy reflecting targets, and means for concomitantly varying with like sense both said angle and the distance between said plane and radar.

2. A monopulse radar comprising in combination means for producing a radiant energy beam with lobes extending on either side of a centerline which extends at a relatively small angle with respect to a selected clearance plane and having a pair of receiver channels for sum and error signals from said lobes, means responsive to variations of said sum signals for compensating both said sum and error signals for variation of signal strength, means responsive to said compensated sum and error signals for indicating distance, in a direction normal to said clearance plane between said radar and energy reflecting targets, and control means for directing the axis of said beam to intersect said clearance plane at a fixed rnage, said control means including means for concomitantly varying with like sense both said angle and the distance between said plane and radar.

3. A monopulse radar having an antenna and a receiver producing sum and difference signals, computing means responsive to said signals for generating an output signal indicative of the elevation of a target relative to a selected clearance plane, said computing means including means for producing a reference signal representing distance from said radar to said clearance plane and means for adjusting said reference signal to thereby adjust said clearance plane, and means responsive to said adjusting means for adjusting the elevation angle of said antenna.

4. A monopulse radar having an antenna and a receiver producing sum and difference signals, computing means responsive to said signals for generating an output signal indicative of the distance of a target above a selected clearance plane, said computing means including means for producing a reference signal representing distance from said radar to said clearance plane and means for adjusting said reference signal to thereby adjust said clearance plane, and means coupled with said adjusting means for adjusting the elevation angle of said antenna in proportion to the adjustment of said clearance plane to cause the boresight of said antenna to intersect the selected clearance plane at a predetermined slant range.

5. A monopulse radar having means for transmitting an energy beam in a direction making a relatively small angle with a selected clearance plane and having a pair of sum and error receiving channels for signals reflected from a target illuminated by said beam, means for generating a signal indicative of range of said target, means for generating a reference signal indicative of a selected perpendicular distance of said radar from said clearance plane, means for generating a signal indicative of said angle, computer means responsive to said signals for indicating the elevation of said target relative to said clearance plane, and means for adjusting said angle in accordance with said reference signal.

6. A monopulse radar having means for transmitting an energy beam in a direction making a relatively small angle with a selected reference plane and having a pair of sum and error receiving channels producing sum and error signals respectively in response to reflections from a target illuminated by said beam, means for generating a signal indicative of range of said target, means for generating a reference signal proportional to the product of said sum signal and a clearance signal indicative of a selected perpendicular distance of said radar from said reference plane, means for generating an angle signal indicative of the sum of said product and said error signal, multiplier means responsive to said range and angle signals for providing an output signal proportional to the product thereof, mixer means responsive to said multiplier output signal and reference signal for providing a signal output indicative of the algebraic sum thereof, and means for adjusting said beam angle in proportion to said clearance signal.

7. A monopulse radar having an antenna and a receiver producing sum and difference signals, computing means responsive to said signals for generating an output signal indicative of the distance of a target above a selected clearance plane, said computing means including means for producing a reference signal representing distance from said radar to said clearance plane and means for adjusting said reference signal to thereby adjust said clearance plane, means coupled with said adjusting means for adjusting the elevation angle of said antenna in proportion to the adjustment of said clearance plane to cause the boresight of said antenna to intersect the selected clearance plane at a predetermined slant range, and means for indicating computer output signals of a single selected polarity together with azimuth and range of said target.

8. In combination with an aircraft, a monopulse radar including an antenna for transmitting a multilobe radiation pattern toward points on the ground along a centerline displaced by a relatively small angle from the flight path of said aircraft, a pair of receiver channels for sum and error signals respectively representing additively and subtractively combined reflections, means for generating a signal indicative of the range of points from which said radiation is reflected, adjustable clearance setting means for generating a clearance signal indicative of the distance between said flight path and a selected clearance plane, means responsive to said signals for producing a warning signal for those of said points extending above said clearance plane, means for generating signals indicative of the pitch and angle of attack of said aircraft, and means for controlling the elevation angle of said antenna in proportion to the sum of said clearance signal and a selected one of said pitch and angle of attack signals.

9. A vehicle borne monopulse radar including an antenna for transmitting a multilobe radiation pattern toward points on the ground along a centerline displaced by a relatively small angle from a predetermined reference plane, a pair of receiver channels for sum and error signals respectively representing additively and subtractively combined reflections, means for generating a signal indicative of the range of points from which said transmitted radiation is reflected, clearance means for generating a signal indicative of the distance between said reference plane and a selected clearance plane, means responsive to said signals for producing a warning signal for those of said points extending above said clearance plane, and means for concomitantly adjusting said clearance means and the elevation angle of said antenna.

10. A monopulse radar comprising in combination a transmitter and an antenna coupled therewith for producing a radiant energy beam with lobes extending on either side of a centerline which extends at a relatively small angle with respect to a selected reference direction, receiving means coupled with said antenna for producing sum and error signals from said lobes, means for generating a reference signal indicative of the distance of a selected clearance plane from said antenna, means responsive to said generating means for controlling said antenna to cause said centerline to intersect said clearance plane at a fixed range, and computing means responsive to said receiving means for generating a warning signal indicative of the elevation relative to said clearance plane of targets illuminated by said beam.

11. A monopulse radar comprising in combination a transmitter and an antenna coupled therewith for producing a radiant energy beam with lobes extending on either side of a centerline which extends at a relatively small angle with respect to a selected reference direction, receiving means coupled with said antenna for producing sum and error signals from said lobes, means for generating a reference signal indicative of the distance of a selected clearance plane from said antenna, means responsive to said generating means for controlling said antenna to cause said centerline to intersect said clearance plane at a fixed range, and computing means responsive to said receiving means for generating a warning signal indicative of the elevation relative to said clearance plane of targets illuminated by said beam, said computing means comprising clearance multiplier means for providing an output proportional to the product of said reference and sum signals, first summing means for providing an output proportional to the sum of said error signal and said multiplier output, a range sweep generator, range multiplier means for providing an output proportional to the product of the output of said range generator and said summing means, and second summing means for providing said warning signal as an output proportional to the sum of said range and clearance multiplier outputs.

12. In combination, a computer, and a monopulse radar having a system trigger and providing sum and difference signals, said radar having an antenna movably mounted in elevation, said computer comprising a first inverter having an input for receiving said difference signal and having a pair of opposite polarity outputs, a potentiometer having an input for receiving said sum signal, a summing and inverting amplifier having a first input from said potentiometer and having a second input and a pair of opposite polarity outputs, a first switch selectively connecting one of said first inverter outputs with said second input, a range generator having an input for receiving said trigger and having an output, a second inverter having an input from said generator and having a pair of opposite polarity outputs, a multiplier having inputs from said second inverter outputs and said inverter amplifier outputs, a second summing and inverting amplifier having a first input from said potentiometer, and having a second input from said multiplier and a pair of opposite polarity outputs, an output amplifier, a second switch selectively connecting one of said second inverting amplifier outputs to said output amplifier, a coil for concurrently operating said switches, means for adjusting said potentiometer, and means for controlling the elevation angle of said antenna in accordance with the adjustment of said potentiometer.

13. A computer for use with a monopulse radar having a system trigger and providing sum and difference signals, said computer comprising a potentiometer having an input for receiving said sum signal, a summing amplifier having a first input from said potentiometer, having a second input for receiving said reference signal and having an output, a range generator having an input for receiving said trigger and having an output, a multiplier having inputs from said summing amplifier and said generator output, a second summing amplifier having a first input from said potentiometer and having a second input from said multiplier, an output amplifier having an input from said second summing amplifier, and means for adjusting said potentiometer.

No references cited.